United States Patent
Xie et al.

(10) Patent No.: US 11,347,952 B2
(45) Date of Patent: May 31, 2022

(54) CAMERA INTERFACE CIRCUIT FOR BARCODE SCANNER

(71) Applicant: NXP USA, INC., Austin, TX (US)

(72) Inventors: Liyan Xie, Shanghai (CN); Mingle Sun, Shanghai (CN); Bin Li, Shanghai (CN); Qiaoyu Ye, Shanghai (CN)

(73) Assignee: NXP USA, Inc., Austin, TX (US)

(*) Notice: Subject to any disclaimer, the term of this patent is extended or adjusted under 35 U.S.C. 154(b) by 0 days.

(21) Appl. No.: 16/237,716

(22) Filed: Jan. 1, 2019

(65) Prior Publication Data

US 2019/0384953 A1 Dec. 19, 2019

(30) Foreign Application Priority Data

Jun. 14, 2018 (CN) .......................... 201810614301.1

(51) Int. Cl.
*G06K 7/10* (2006.01)
*G06T 5/40* (2006.01)

(52) U.S. Cl.
CPC ..... *G06K 7/10851* (2013.01); *G06K 7/10722* (2013.01); *G06K 7/10841* (2013.01); *G06T 5/40* (2013.01)

(58) Field of Classification Search
CPC .................................................. G06K 7/10851
USPC ...................................................... 235/462.25
See application file for complete search history.

(56) References Cited

U.S. PATENT DOCUMENTS

| | | | |
|---|---|---|---|
| 7,780,084 B2 | 8/2010 | Zhang | |
| 2005/0011957 A1* | 1/2005 | Attia | G06K 7/10722 235/462.46 |
| 2005/0254106 A9* | 11/2005 | Silverbrook | H04N 1/00968 358/539 |
| 2010/0042874 A1 | 2/2010 | Lee | |
| 2013/0126615 A1 | 5/2013 | McCloskey et al. | |
| 2013/0181055 A1* | 7/2013 | Liu | G06K 7/10722 235/462.42 |
| 2017/0201746 A1 | 7/2017 | An et al. | |

* cited by examiner

*Primary Examiner* — Rafferty D Kelly

(57) ABSTRACT

A camera interface circuit for a barcode scanner includes a binary conversion block and a selection module. The binary conversion block receives image signals from a camera, and converts gray levels of each pixel in each image frame into binary codes. The selection module alternately provides binary codes of one image frame and image signals of a consecutive image frame as outputs.

14 Claims, 1 Drawing Sheet

CAMERA INTERFACE CIRCUIT FOR BARCODE SCANNER

BACKGROUND

The present invention generally relates to barcode scanners, and, more particularly, to a camera interface circuit for a barcode scanner.

Barcode scanners are used for scanning barcodes, like 1D (1-dimensional) barcodes, 2D (2-dimensional) barcodes, or QR (Quick Response) codes. A barcode scanner normally includes a camera for capturing a barcode image. The camera also converts the captured image into an image signal, and provides the image signal to a processor that has embedded software. The processor converts the image signal to a binary signal, and decodes the binary signal to retrieve the information contained in the barcode. The camera also can provide the image signal to a display unit for previewing of the captured barcode image.

Typically, the processor interacts with one or more memories during the image signal processing. For example, the processor performs write operations to store intermediate signals in memory, and read operations to retrieve the stored intermediate signals for a next process. The memories add cost to the scanner and increase the circuit size, and the read/write operations increase processing time. Accordingly, it would be advantageous to have a barcode scanner that requires less memory and performs fewer memory read and write operations.

SUMMARY

This summary is provided to introduce a selection of concepts in a simplified form that are further described below in the Detailed Description. This summary is not intended to identify key or essential features of the claimed subject matter, nor is it intended to be used to limit the scope of the claimed subject matter.

In one embodiment, the present invention provides a camera interface circuit for a barcode scanner. The camera interface circuit includes a binary converter block and a selection module. The binary converter block receives image signals from a camera, and converts gray levels of each pixel in each image frame into binary codes. The selection module alternately outputs binary codes of one image frame and image signals of a consecutive image frame.

In another embodiment, the present invention provides a method for processing image signals of a barcode scanner. The method includes receiving the image signals from a camera of the barcode scanner, converting the image signals to binary by converting gray levels of each pixel in each image frame into binary codes, and alternately outputting binary codes of one image frame and image signals of a consecutive image frame.

In yet another embodiment, the present invention provides a method for processing image signals of a barcode scanner. The method includes receiving a first image frame from a camera of the barcode scanner, providing an image signal of the first image frame as a first output, and receiving a second image frame from the camera of the barcode scanner, where the second image frame is consecutive to the first image frame. The method further includes converting gray levels of pixels of the second image frame into binary codes, and providing the binary codes as a second output.

BRIEF DESCRIPTION OF THE DRAWINGS

So that the manner in which the above recited features of the present invention can be understood in detail, a more detailed description of the invention may be had by reference to embodiments, some of which are illustrated in the appended drawings. The appended drawings illustrate only typical embodiments of the invention and should not limit the scope of the invention, as the invention may have other equally effective embodiments. The drawings are for facilitating an understanding of the invention and thus are not necessarily drawn to scale. Advantages of the subject matter claimed will become apparent to those skilled in the art upon reading this description in conjunction with the accompanying drawings, in which like reference numerals have been used to designate like elements, and in which:

DETAILED DESCRIPTION

Figure 1:
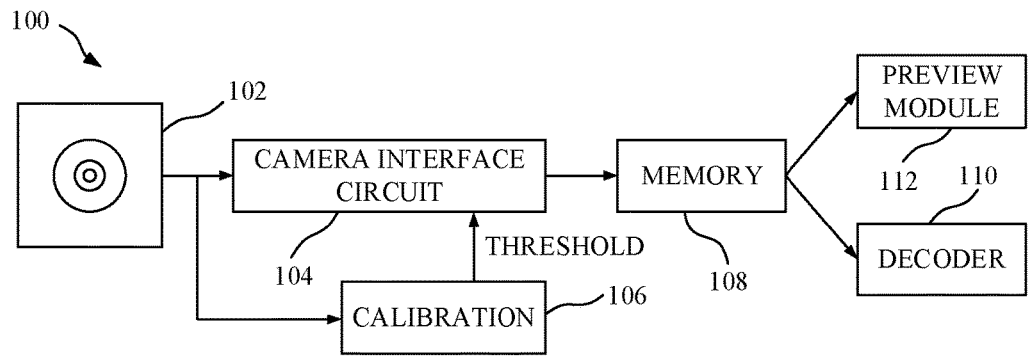
FIG. 1 is schematic block diagram of a barcode scanner according to an embodiment of the present invention.

FIG. 1 is a schematic block diagram of a barcode scanner 100 according to an exemplary embodiment. The barcode scanner 100 includes a camera 102 and a camera interface circuit 104. The camera 102 scans or takes pictures of target images and generates image signals of the target images. The camera 102 may be any type of image capture device, such as a camera built into a mobile device, as will be understood by those of skill in the art. The image signals are provided to the camera interface circuit 104. The camera interface circuit 104 receives the image signals and, on one hand conveys the image signals for subsequent previewing, and on the other hand converts the image signals into binary codes. Data generated by the camera interface circuit 104 is provided to and stored in a memory 108. The memory 108 may either be included in the barcode scanner 100 in one of the embodiments, or be separated from the barcode scanner 100 in other embodiments. Subsequently, the memory 108 provides the stored data to a decoder 110 to decode the image of the scanned barcode. In other embodiments, the stored data is provided to a display or preview module 112 to display a preview of the scanned image. Thus, in the present invention, only every other frame is provided to the preview module 112, which reduces the processing load by 50%, yet does not critically deteriorate the resolution of a previewed image since neighboring image frames generally have very little difference. Accordingly, the processing speed of the preview module 112 is improved.

The camera 102 takes pictures of the image frame by frame, and the generated image signals are organized to describe luminance and chrominance of each pixel in the image frames. An example of an image signal is the YUV format, which is defined in ITU-R Recommendation BT.709. For YUV format image signals, an image frame has 24 data bits, where the first 8 bits represent the luminance component (Y), and the following 16 bits represent the chrominance components (UV). In converting the image signals to binary, the camera interface circuit 104 takes only the first 8 bits of data for each image frame to extract the gray values of the pixels of the scanned images, and compares the gray values with a predetermined threshold. In the current embodiment, the camera interface circuit 104 converts every other image frame to binary for the decoder 110 to decode, while the non-converted image frames, e.g., the original YUV format data signals, are provided directly to the preview module 112. In this way, the camera interface circuit 104 does not convert every image frame into binary codes, which improves the processing efficiency of the barcode scanner 100. In the presently preferred embodiment, odd image frames are provided to the preview module 112, while even image frames are converted to binary and provided to the decoder 110.

According to the current embodiment, the threshold used for the binary conversion is adjustable. A calibration module 106 provides a dynamic threshold for the camera interface circuit 104. The calibration module 106 receives the image signals from the camera 102, and performs statistical operations on the image signals to generate an adjusted threshold, which is calculated based on a histogram of gray levels of a scanned image frame. The adjusted threshold is provided to the camera interface circuit 104 for binary conversion operations of the following one or several image frames. In the presently preferred embodiment, the image signals for odd frames are provided for both the preview module 112, and calculation of the adjusted threshold by the calibration module 106, such that the adjusted threshold is used for binary conversion of a subsequent even image frame. Because consecutive image frames normally have only very slight differences, the calculated threshold is accurate for the subsequent target image frame.

According to the present embodiment, binary conversion of the image frames is implemented using the camera interface circuit 104 instead of a separate processor, and little or no additional memories are required, thus, both size and cost of the barcode scanner 100 are saved. Furthermore, excessive interactions with memories are eliminated, so image processing time is improved.

Figure 2:
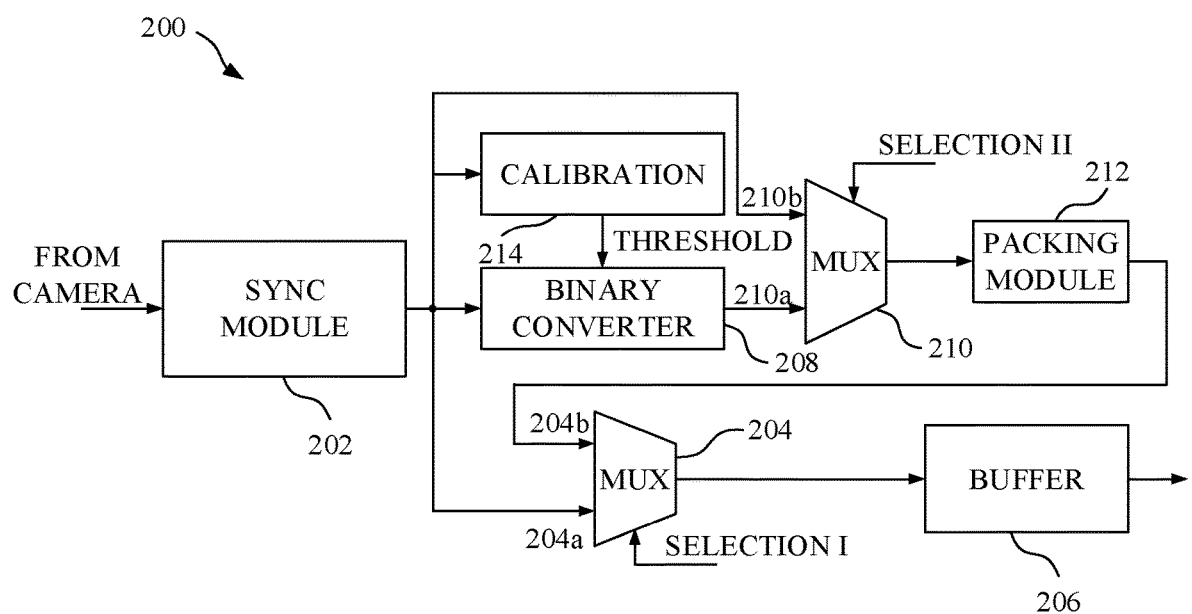
FIG. 2 is a schematic block diagram of a camera interface circuit according to an embodiment of the present invention.

Referring now to FIG. 2, a schematic block diagram of a camera interface circuit 200 according to an embodiment of the present invention is shown. The camera interface circuit 200 includes a synchronization module 202, which receives the image signals from the camera and generates synchronized image signals as a response. The synchronization module 202 ensures the image signals from the camera are synchronized with the operating frequency of the camera interface circuit 200. Because the camera and the interface circuit 200 have separate clocks, the signals from the camera may have different phases/frequencies that need to be synchronized in order to be suitable for processing by the camera interface circuit 200. The synchronization module 202 receives the clock signal of the camera interface circuit 200, and converts the image signals to the appropriate frequency/phase with the clock signal to be synchronized image signals.

The camera interface circuit 200 further includes a first selection module 204 which receives, on a first input terminal 204a thereof, the synchronized image signals from the sync module 200, and on a second input terminal 204b thereof, a packed binary code generated based on the synchronized image signals. Based on an applied selection signal (SELECTION I), the selection module 204 provides either the synchronized image signal or the packed binary code to a subsequent buffer 206. The buffer 206 provides the synchronized image signal as an output signal of the camera interface circuit 200 to a preview module like the preview module 112 of FIG. 1, and provides the packed binary code as the output signal of the camera interface circuit 200 to a decoder like the decoder 110 of FIG. 1.

The selection module 204 may be implemented as a multiplexer (MUX), as illustrated in FIG. 2. The first and second input terminals 204a and 204b are input lines of the MUX 204, while the selection signal (SELECTION I) is applied to a select line of the MUX 204. As described above, the odd image frames have not been converted to binary, and these odd image frames are provided as the synchronized image signal to a display like the preview module 112 of FIG. 1 for viewing. On the other hand, the even image frames are converted to the packed binary code and are provided to a decoder, like the decoder 110 (FIG. 1) for decoding, by way of the buffer 206. The selection signal can be generated in many ways, for example from a controller or a register. Taking the register (not shown) for example, the register may count the pixel data in an image frame transmitted to the selection module 204, and when the count reaches a predetermined value that indicates all pixels in one frame have been transmitted, the register outputs a signal as the selection signal (SELECTION I) that enables the selection module 204 to provide the synced image signals as the output.

The camera interface circuit 200 includes a binary converter 208, which receives the synchronized image signals from the synchronization module 202. As described above, the binary converter 208 extracts gray components included in the image signals, and compares the gray level of each pixel with a threshold value. In this way, a binary code of "0" or "1" is generated based on the comparison if the gray level of the pixel is higher or lower than the threshold value. An optional second selection module 210 receives, at a first input terminal 210a, the binary codes from the binary converter 208, the synced image signal at another input terminal 210b (unconverted data), and a selection signal SELECTION II at a selection terminal. When the barcode scanner is in a standby mode, the selection signal SELECTION II enables the second selection module 210 to provide the unconverted image signals as the output, such that binary conversion and the subsequent decoding are bypassed. This unconverted image signal comprises gray level data and is provided at the input terminal 210b and may be used for a backup function, for example checking the binary conversion, etc. A packing module 212 is included in the camera interface circuit 200 to pack the binary codes or the unconverted gray level data into predetermined data formats, for example 32 bits, 64 bits, or 128 bits, per cycle. According to the present embodiment, an exemplary 0.3 M, YUV422 CMOS sensor camera providing an image of 600 kB size will be transformed to binary codes of 37.5 kB, which is only 1/16 of the original image data size, which saves considerable memory space.

The camera interface circuit 200 also includes a calibration module 214, which receives the synchronized image signals from the synchronization module 202. The calibration module 214 extract the gray level of the pixels of each image frame, and a count number of the pixels that have a corresponding gray level. In the current embodiment, the gray levels are within a range of 0-255, and the calibration module 214 counts the number of the pixels that have each of the gray levels. After the gray levels of all the pixels have been counted, a histogram is generated indicating the pixel gray level distribution of the current image frame. The calibration module 214 receives the histogram data and determines a threshold value therefrom. In alternative embodiments, the threshold value is calculated using embedded software, which executes specific algorithms on the histogram data. The threshold value is provided to the binary converter 208 during a vertical blanking interval between neighboring image frames. The determined threshold is provided to the binary converter 208 as the threshold for binary conversion following one or several image frames. The threshold is dynamic and accurate because consecutive image frames normally reflect similar gray level distributions. Similar to the calibration module 106 of FIG. 1, the calibration module 214 here also is optional.

The operation of the camera interface circuit 200 of FIG. 2 has now been described. The image signals from the camera are provided to the synchronization module 202, which generates synchronized image signals. The first selection module 204 provides image signals for the odd frames to a display for previewing the image. The calibration module 214 generates an adjusted threshold using the histogram data of gray levels of the pixels of the odd image frames, for example during the vertical blanking interval between the odd frame and a subsequent even frame, and provides the adjusted threshold to the binary converter 208. A following even image frame is then input to the binary converter 208 to extract the gray levels and convert into binary codes through comparison with the adjusted threshold. The second selection module 210 provides the generated binary codes to the packing module 212, which in response outputs packed binary codes in the desired format. The first selection module 204 provides the packed binary codes to the buffer 206, which then are provided to a decoder. Alternatively, the packed gray level values may be output such as for backup functions.

The camera interface circuit 200 and the image signal processing method according to the embodiments described above provide consecutive image frames alternately to the preview module and the binary converter. Because consecutive image frames typically only have minor differences, there is nearly no distortion in either the preview or the binary conversion. Further, the camera interface circuit 200 requires little memory and few memory accesses, so the camera interface circuit is compact in size and has quick response.

The use of the terms "a" and "an" and "the" and similar referents in the context of describing the subject matter (particularly in the context of the following claims) are to be construed to cover both the singular and the plural, unless otherwise indicated herein or clearly contradicted by context. Recitation of ranges of values herein are intended merely to serve as a shorthand method of referring individually to each separate value falling within the range, unless otherwise indicated herein, and each separate value is incorporated into the specification as if it were individually recited herein. Furthermore, the foregoing description is for the purpose of illustration only, and not for the purpose of limitation, as the scope of protection sought is defined by the claims set forth hereinafter together with any equivalents thereof entitled to. The use of any and all examples, or exemplary language (e.g., "such as") provided herein, is intended merely to better illustrate the subject matter and does not pose a limitation on the scope of the subject matter unless otherwise claimed. The use of the term "based on" and other like phrases indicating a condition for bringing about a result, both in the claims and in the written description, is not intended to foreclose any other conditions that bring about that result. No language in the specification should be construed as indicating any non-claimed element as essential to the practice of the invention as claimed.

Preferred embodiments are described herein, including the best mode known to the inventor for carrying out the claimed subject matter. Of course, variations of those preferred embodiments will become apparent to those of ordinary skill in the art upon reading the foregoing description. The inventor expects skilled artisans to employ such variations as appropriate, and the inventor intends for the claimed subject matter to be practiced otherwise than as specifically described herein. Accordingly, this claimed subject matter includes all modifications and equivalents of the subject matter recited in the claims appended hereto as permitted by applicable law. Moreover, any combination of the above-described elements in all possible variations thereof is encompassed unless otherwise indicated herein or otherwise clearly contradicted by context.

The invention claimed is:

1. A camera interface circuit for a barcode scanner, comprising:
   a binary conversion block configured to
      receive image signals of a second image frame from a camera,
      extract gray levels of each pixel in the second image frame,
      compare the gray levels of the pixels with a threshold, and
      generate binary codes of "1" or "0" based on the comparison of the gray level of the pixels being above or below the threshold, wherein the threshold is adjustable;
   a calibration module configured to
      receive image signals of a first image frame, and
      generate the threshold value that is provided to the binary conversion block for said comparison, wherein the threshold is calculated using a histogram of the pixel gray levels of the first image frame; and
   a first selection module connected to the binary conversion block and configured to alternately provide the binary codes of the image frame and image signals of a consecutive image frame as an output.

2. The circuit of claim 1, further comprising a decoder connected to the first selection module, wherein the decoder receives and decodes the output binary codes as information of a scanned barcode.

3. The circuit of claim 1, further comprising a display module connected to the first selection module, wherein the display module previews the output image signals.

4. The circuit of claim 1, wherein the threshold has a predetermined value.

5. The circuit of claim 1, wherein the first selection module is a multiplexer having a first input terminal receiving the binary codes and a second input terminal receiving the image signals.

6. The circuit of claim 1, further comprising an output buffer coupled with the first selection module for buffering the output of the first selection module.

7. The circuit of claim 1, further comprising a synchronization module for synchronizing image signals from the camera and providing synchronized image signals to the binary conversion block and the first selection module as the image signals.

8. The circuit of claim 1, further comprising a packing module connected to the binary conversion block and configured to pack the binary codes into a predetermined format.

9. A method for interfacing image signals for a barcode scanner, comprising:
   receiving the image signals of a second image frame from a camera of the barcode scanner;
   converting the image signals of the second image frame to binary by converting gray levels of each pixel in the second image frame into binary codes, wherein said converting comprises
      extracting gray levels of each pixel in the second image frame,
      comparing the gray levels of the pixels with a threshold, and generating binary codes of "1" or "0" based on the comparison of the gray level of the pixels being above or below the threshold, wherein the threshold is adjustable; and receiving the image signals of a first image frame from the camera;

generating the threshold value for said comparing, wherein the threshold value is calculated using a histogram of the pixel gray levels of the first image frame;

alternately providing binary codes of the second image frame and image signals of the first image frame as respective first and second outputs, wherein the first output is provided to a display device for previewing an image represented by the image signals, and the second output is provided to a decoder for decoding a bar code represented by the image signals.

10. The method of claim 9, wherein the receiving the image signals from the camera of the barcode scanner comprises:

synchronizing the image signals.

11. The method of claim 9, further comprising:

packing the binary codes into a predetermined format.

12. A method for processing image signals for a barcode scanner, comprising:

receiving a first image frame from a camera of the barcode scanner;

providing an image signal of the first image frame as a first output to a display module and displaying a preview of the image signal;

receiving a second image frame from the camera, wherein the second image frame is consecutive to the first image frame;

converting gray levels of pixels of the second image frame into binary codes, wherein said converting is performed using threshold information generated from the first image frame; and providing the binary codes as a second output to a decoder.

13. The method of claim 12, wherein the conversion of the gray levels of pixels of the second image frame into binary codes comprises:

extracting gray levels of each pixel in the second image frame;

comparing the extracted gray levels of the pixels with a threshold; and generating binary codes of "1" or "0" based on the comparison of the gray level of the pixels being above or below the threshold.

14. The method of claim 13, further comprising:

analyzing the first image frame to generate a histogram of pixel gray levels;

calculating an adjusted threshold using the histogram; and using the adjusted threshold for said comparing.

* * * * *